No. 704,131. Patented July 8, 1902.
C. W. SLEETER.
CULTIVATOR.
(Application filed Nov. 16, 1901.)
(No Model.)
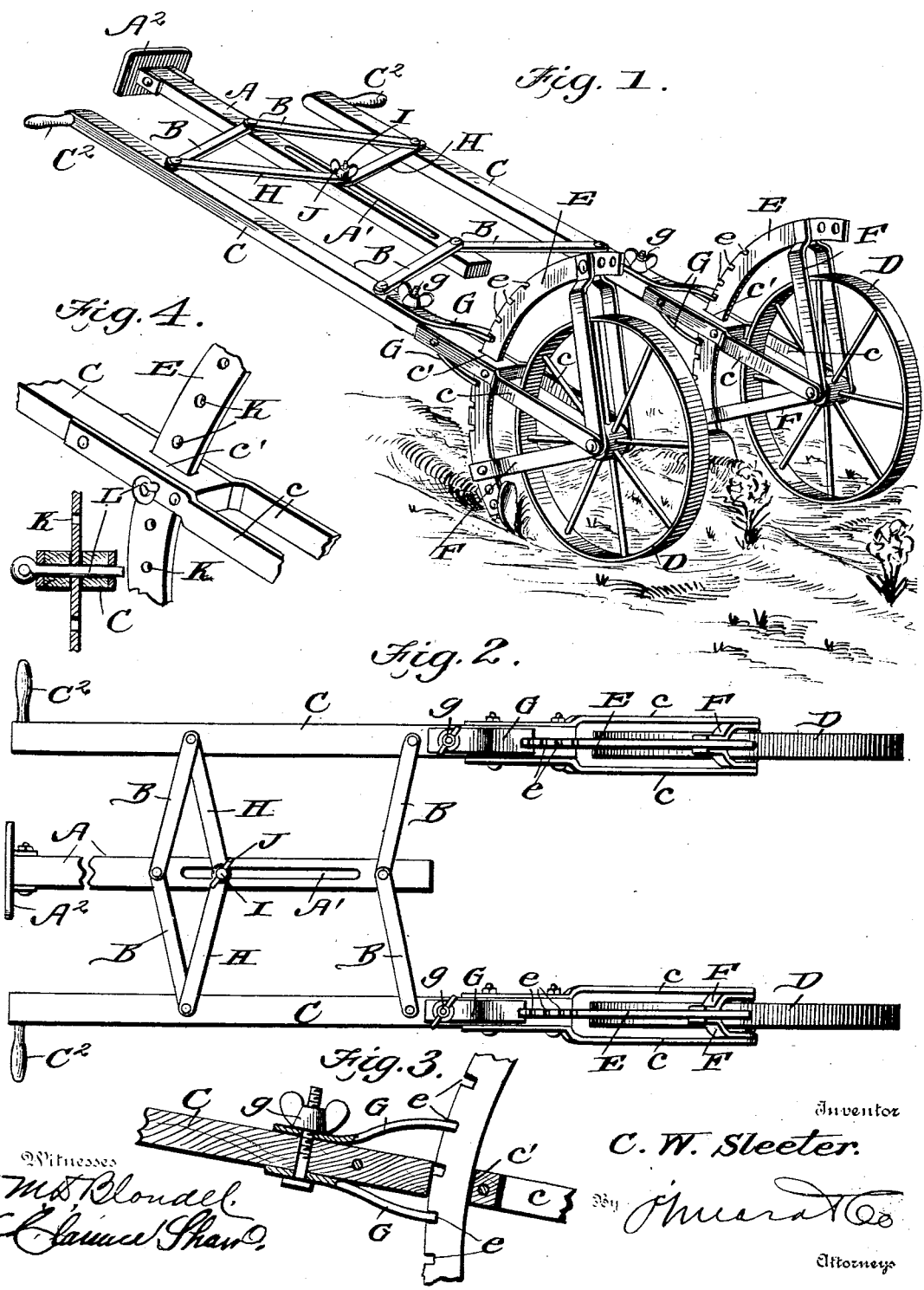

UNITED STATES PATENT OFFICE.

CHARLES W. SLEETER, OF DECATUR, ILLINOIS.

CULTIVATOR.

SPECIFICATION forming part of Letters Patent No. 704,131, dated July 8, 1902.

Application filed November 16, 1901. Serial No. 82,607. (No model.)

*To all whom it may concern:*

Be it known that I, CHARLES W. SLEETER, a citizen of the United States, residing at Decatur, in the county of Macon and State of Illinois, have invented a new and useful Cultivator, of which the following is a specification.

My invention is an improvement in cultivators, and relates particularly to hand-cultivators, one object being to provide an arrangement in which various forms of cultivators or plow-points and other garden implements may be conveniently and easily used.

Another object of my invention is to so construct a device that the various forms of cultivators or plow-points are arranged to work between the rows of plants and also to so construct the device that the plants will not in the least be interfered with or injured during the operation of cultivation.

Still a further object is to provide an arrangement whereby the cultivator-point may be readily adjusted to cut a deep or shallow furrow; and with these and other objects in view my invention consists in certain new and novel combinations and arrangement of parts, as will be fully described in the following specification and pointed out in the claims, reference being had to the drawings, in which—

Figure 1 is a perspective view of my improved device having cultivator-points attached thereto. Fig. 2 is a plan view of the same. Fig. 3 is a detail view showing the manner of locking the adjusting-bar, and Fig. 4 is a detail view of a slightly-different arrangement of locking the said bar in its various adjustable positions.

In carrying out my invention I employ what I shall term a "central draft-beam" A, upon which is pivotally held at the front and near the rear end thereof flat metallic bars B, whose outer ends are pivotally connected to side beams C, which are arranged parallel with the central draft-beam and each having their forward end provided with forwardly-extending bracket-arms $c$ $c$, in the extreme forward ends of which are journaled supporting-wheels D. The journal ends of the beams C are also provided with short slots $c'$, in which is adapted to operate a semicircular rack-bar E, whose ends are provided with apertures by which the cultivator-points may be securely fastened thereto. This bar is adapted to be moved through the slot $c'$, so the cultivator-points may be adjusted to cut a deep or shallow furrow, and in order to provide a simple arrangement for holding the bar securely in position I provide brace-arms F, which are connected to the bars E near their ends and are pivotally held upon the axles of the supporting-wheels. Of course it will be understood that the radius of the bar E is struck from the center of its respective wheel, which permits it to readily slide through the slot in the beam, and in order to provide a simple but positive arrangement for locking the bar in position I arrange upon the upper and lower side of the bars C stout spring-pawls G, that are held to the said beams by means of bolts and thumb-nuts, as shown at $g$. The forward or free ends of the pawls are adapted to engage in notches $e$, formed in the periphery of the bars E. By this arrangement it will be readily seen that the bars E may be firmly held to any adjusted position, it being only necessary to loosen the nut, when the spring-pawls may be released from the notches and the bar adjusted, after which the pawls are again engaged with the bar and the nut tightened, when the bar will be again held in position.

By the arrangement shown and described it will be seen that the bars C may be adjusted to or form the central beam A, so as to accommodate the cultivator-points to rows of various widths, and in order to firmly hold the bar C to the proper gage I arrange upon the outer pivotal point of the rear bars B bracing-bars H, whose inner ends are provided with apertures, through which extends a bolt I, that also passes through a slot A', formed in the beam A, the said bars H being held in position by a thumb-nut J. The operation of this arrangement will be readily apparent.

In practice I prefer to provide the rear end of the beam A with a breastplate $A^2$ and also to provide the rear ends of the beams C with grip-handles $C^2$.

In operation after the bars E have been adjusted and the bars C regulated to accommodate the row of plants the plate $A^2$ is positioned against a person's breast, when the grip-handles are caught and the machine is then in position to be pushed forward. By arranging the grip-handles as stated the cultivator-points may be raised or lowered to a small degree without the necessity of adjusting the bar E, and should it be desired to transport the machine the beam is swung to the opposite side of the wheels, when the cultivator-points will be supported above them and the machine in that position transferred to any place desired. It may also be stated that plow-points or different style of cultivator-points may be carried upon the bars E at the same time that the cultivator-points, as shown in the drawings, are being used.

In Fig. 4 I have shown a different arrangement for supporting the bars E in their adjusted position in that I provide the said bars with apertures K, that are adapted to be brought into alinement with apertures arranged in the bar C and brackets c, through which a pin or bolt L is adapted to pass and by which the bars E are firmly locked into position.

From the foregoing it will be seen that I provide a very simple, compact, and easily-operated machine to which various forms of cultivator implements may be connected that will be found particularly adapted for use in garden or truck-farming work.

Having thus fully described my invention, what I claim as new, and desire to secure by Letters Patent, is—

1. A device of the kind described, comprising a central draft-beam, beams arranged parallel thereto and having their forward ends provided with supporting-wheels, rack-bars adjustably held in the forward ends of the beams and adapted to carry cultivator-points, spring-pawls arranged upon the beams for engagement with the said rack-bars and means connecting the said draft-beam and parallel beams for adjustably holding the said beams parallel to the draft-beam, substantially as shown and described.

2. The combination of a central draft-beam having a slot arranged therein, parallel beams arranged upon either side of the draft-beam and having slots arranged therein, their forward ends being provided with brackets, wheels journaled in the said brackets, semicircular bars adapted to be held in the said parallel beams and having cultivator-points arranged upon the ends thereof, brackets journaled upon the axles of the said wheels and having their ends connected to the said semicircular bars and means carried by the said parallel beams for holding the semicircular bars firmly in position, bars pivotally held at one end to the draft-beam and having their outer ends pivotally connected to the parallel beams and bracing-arms pivotally connected to the parallel bars at one end and having their opposite ends provided with apertures through which passes a bolt that is adapted to operate in the slot of the said draft-beam and means for holding the said arms to the beam, substantially as shown and described.

3. The combination of a central draft-beam having a slot arranged therein, parallel beams arranged upon either side of the said draft-beam, and having slots arranged in the forward ends thereof, bars connecting the said beams, supporting-wheels carried by the parallel beams, semicircular rack-bars held in the slots of the parallel bars, and adapted to carry cultivator-points, spring-pawls arranged for engagement with the rack-bars, a breastplate arranged upon the rear end of the draft-beam and grip-handle sections arranged upon the parallel beams, substantially as shown and described.

CHARLES W. SLEETER.

Witnesses:
VILLA MARY MILLS,
F. M. COX.